United States Patent
Wang et al.

(10) Patent No.: US 10,211,931 B1
(45) Date of Patent: Feb. 19, 2019

(54) METHOD OF INTERFERENCE CANCELLATION AND TRANSCEIVING DEVICE

(71) Applicant: Realtek Semiconductor Corp., HsinChu (TW)

(72) Inventors: Chin-Liang Wang, Hsinchu (TW); Kuan-Kai Chen, Taipei (TW); Min-Chau Jan, Taipei (TW); Wen-Shan Wang, Tainan (TW); Yuan-Shuo Chang, Hsinchu (TW); Ying-Hsi Lin, Hsinchu (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 16/039,303

(22) Filed: Jul. 18, 2018

(30) Foreign Application Priority Data

Sep. 22, 2017 (TW) .............................. 106132566 A (51) Int. Cl.
*H04B 15/00* (2006.01)
*H04B 1/40* (2015.01)

(52) U.S. Cl.
CPC .............. *H04B 15/00* (2013.01); *H04B 1/40* (2013.01)

(58) Field of Classification Search
CPC . H04B 15/00; H04B 1/40; H04B 1/10; H04B 1/1027; H04B 1/123; H04B 1/71072
See application file for complete search history.

(56) References Cited

U.S. PATENT DOCUMENTS

| 8,107,572 | B1 | 1/2012 | Furman | |
|---|---|---|---|---|
| 2017/0085252 | A1* | 3/2017 | Sheikh | H03H 21/0012 |
| 2017/0188264 | A1* | 6/2017 | Hwang | H04B 1/1027 |
| 2018/0026775 | A1* | 1/2018 | Chen | H04B 1/44 |
| | | | | 370/278 |

OTHER PUBLICATIONS

Chin-Liang Wang, Kuan-Kai Chen, Min-Chau Jan, Yuan-Shuo Chang, Erlang Wang, and Ying-Hsi Lin, Adaptive Cancellation of Transmitter Leakage in Frequency-Division Duplexing Transceivers, WOCC 2018, Apr. 30-May 1, 2018, Hualien, Taiwan.

* cited by examiner

*Primary Examiner* — Tuan Pham
(74) *Attorney, Agent, or Firm* — Winston Hsu (57) ABSTRACT

A method of interference cancellation includes the following steps: performing a take-energy operation on a to-be-sent signal at multiple times to generate multiple to-be-sent signal powers; performing a first high-pass operation on the to-be-sent signal powers to generate a to-be-sent high-pass result; performing a second high-pass operation on a received signal to generate a received high-pass result; adjusting multiple filter coefficients according to the to-be-sent high-pass result and the received high-pass result; and generating a recover signal according to the filter coefficients.

16 Claims, 6 Drawing Sheets

METHOD OF INTERFERENCE CANCELLATION AND TRANSCEIVING DEVICE

BACKGROUND OF THE INVENTION

1. Field of the Invention

The present disclosure relates to an interference cancellation method and a transceiving device, and more particularly, to an interference cancellation method and a transceiving device capable of eliminating interference caused by signal leakage.

2. Description of the Prior Art

Frequency Division Duplexing (FDD) technology has been widely used in communication systems such as UMTS, LTE and LTE-A. FDD technology uses a duplexer comprising two band pass filters (BPF) to isolate the transmitted signal from the received signal, and vice versa. In general, the transmitted signal should not be leaked to the receiving (RX) Chain. However, the transceiver hardware has been continuously miniaturized, it is difficult for a duplexer to isolate the transmitted signal from the received signal, and there is signal leakage from the transmitting (TX) output to the RX input, a.k.a., TX signal leakage.

Furthermore, RF front-end components of the transceiver, such as the power amplifier, the low noise amplifier and the mixer, would cause non-ideal or nonlinearity effects, such as the $2^{nd}$-order intermodulation (IM2), the $3^{rd}$-order cross-modulation (CM3), the $3^{rd}$-order intermodulation (IM3). In other words, the non-ideal/nonlinearity effect of the RF front-end components would produce (out-of-band, OOB) interference to the received signal.

Therefore, how to eliminate interference caused by TX signal leakage in FDD system is a significant objective in the field.

SUMMARY OF THE INVENTION

It is therefore a primary objective of the present disclosure to provide an interference cancellation method and a transceiving device capable of eliminating interference caused by TX signal leakage in FDD system, to improve over disadvantages of the prior art.

An embodiment of the present disclosure provides an interference cancellation method applied in an interference cancellation module of a transceiving device. The interference cancellation module is coupled between a transmitting (TX) chain and a receiving (RX) chain of the transceiving device, and generates a recover signal according to a to-be-sent signal at an input terminal of the TX chain and a received signal at an output terminal of the RX chain. The interference cancellation method includes steps of performing a take-energy operation on the to-be-sent signal at multiple times, to generate multiple to-be-sent signal powers; performing a first high-pass operation on the to-be-sent signal powers, to generate a to-be-sent high-pass result; performing a second high-pass operation on the received signal, to generate a received high-pass result; adjusting multiple filter coefficients according to the to-be-sent high-pass result and the received high-pass result; and generating the recover signal according to the filter coefficients.

An embodiment of the present disclosure further provides a transceiving device, which comprises a TX chain, an RX chain, a duplexer and an interference cancellation module. The duplexer is coupled between an output terminal of the TX chain and an input terminal of the RX chain. The interference cancellation module is coupled between an input terminal of the TX chain and an output terminal of the RX chain, and configured to generate a recover signal according to a to-be-sent signal at the input terminal of the TX chain and a received signal at the output terminal of the RX chain. The interference cancellation module includes an energy module, a first high pass filter, a second high pass filter and an adaptive filtering submodule. The energy module performs a take-energy operation on the to-be-sent signal at multiple times to generate multiple to-be-sent signal powers. The first high pass filter performs a first high-pass operation on the to-be-sent signal powers, to generate a to-be-sent high-pass result. The second high pass filter performs a second high-pass operation on the received signal, to generate a received high-pass result. The adaptive filtering submodule adjusts multiple filter coefficients according to the to-be-sent high-pass result and the received high-pass result, and generates the recover signal according to the filter coefficients.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
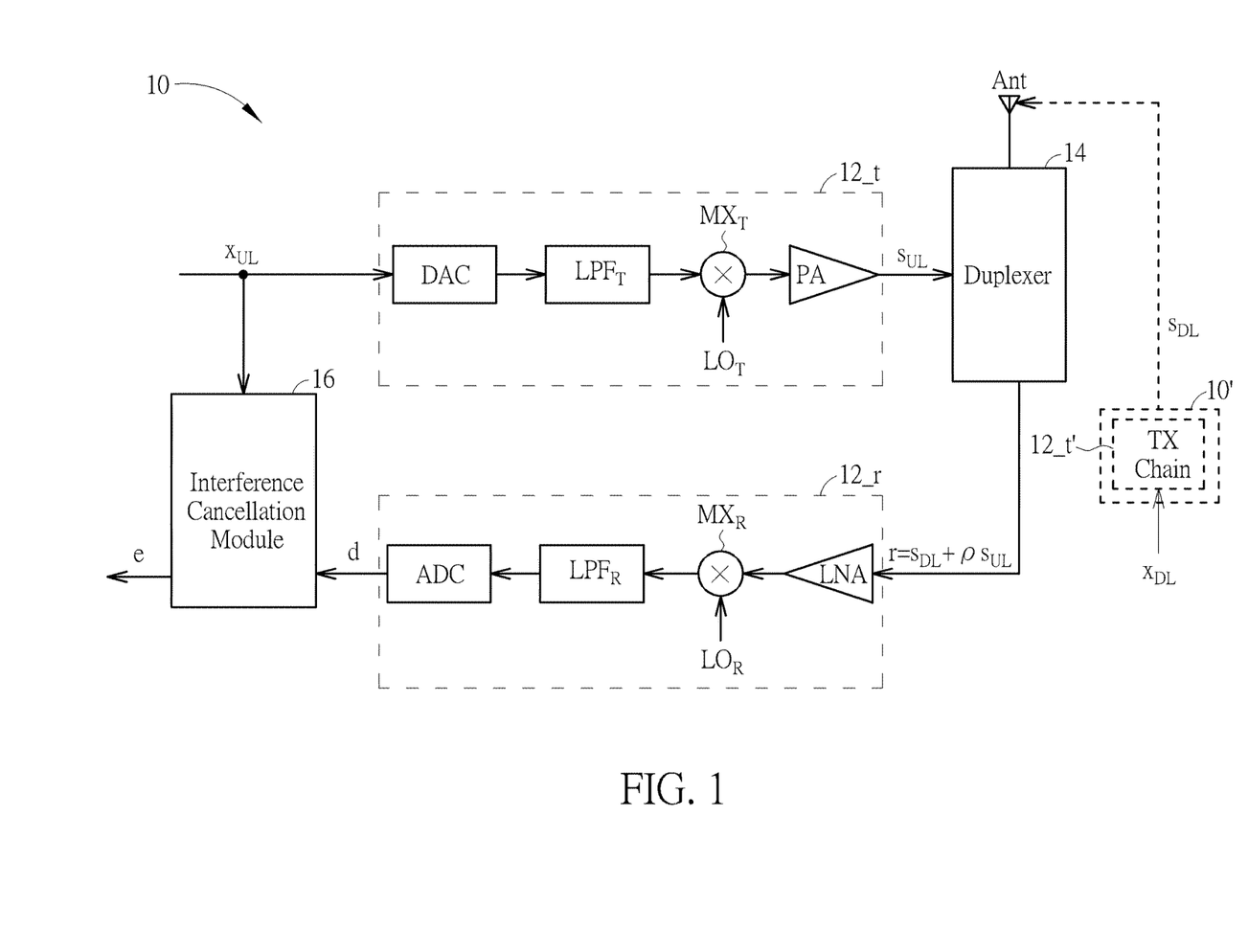
FIG. 1 is a schematic diagram of a transceiving device according to an embodiment of the present disclosure.

FIG. 1 is a schematic diagram of a transceiving device 10 according to an embodiment of the present disclosure. The transceiving device 10 operates in a Frequency Division Duplexing (FDD) communication system such as UMTS, LTE or LTE-A. In other words, the to-be-sent signal and the to-be-received signal of the transceiving device 10 belong to two different frequency bands. For illustrative purpose, the following description of the transceiving device 10 is in an user equipment (UE) perspective, where the to-be-sent signal of the transceiving device 10 is denoted as "$U_L$", and the to-be-received signal of the transceiving device 10 is denoted as "$D_L$". Nevertheless, the transceiving device 10 is not limited to be the UE. The transceiving device 10 may also be a wireless station or a base station.

The transceiving device 10 comprises a transmitting chain (TX chain) 12_t, a receiving chain (RX chain) 12_r and a duplexer 14. An input terminal of the TX chain 12_t receives a to-be-sent signal $x_{UL}$ and generates a radio-frequency (RF)

to-be-sent signal $s_{UL}$. The duplexer 14 is coupled to the TX chain 12_$t$ and an antenna Ant of the transceiving device 10. The antenna Ant receives an RF to-be-received signal $s_{DL}$ from another device 10', where the RF to-be-received signal $s_{DL}$ represents an RF signal generated by a TX chain 12_$t'$ of the device 10' according to a to-be-received signal $x_{DL}$, attenuated by a path loss and arriving at the antenna Ant. The RX chain 12_$r$ is coupled to the duplexer 14. An input terminal of the RX chain 12_$r$ receives a signal r, and the signal r may be represented as $r = s_{DL} + \rho s_{UL}$, where $\rho$ represents an isolation attenuation of the duplexer 14 applied to $s_{UL}$. The RX chain 12_$r$ down-converts the signal r from RF to baseband and converts as a digital signal, i.e., generates a received signal d according to the signal r, where the received signal d is a baseband digital signals, so are the to-be-sent signal $x_{UL}$ and the to-be-received signal $x_{DL}$. In addition, the RF to-be-sent signal $s_{UL}$, the RF to-be-received signal $s_{DL}$ and the signal r are analog RF signals.

The structure of the TX chain 12_$t$ and the RX chain 12_$r$ is described as follows. The TX chain 12_$t$ comprises a digital-to-analog converter DAC, a low pass filter $LPF_T$, a mixer $MX_T$ and a power amplifier PA. The RX chain 12_$r$ comprises a low noise amplifier LNA, a mixer $MX_R$, a low pass filter $LPF_R$ and an analog-to-digital converter ADC, where the analog-to-digital converter ADC outputs the received signal d.

Under a condition that the isolation attenuation $\rho$ is insufficient to provide sufficient isolation, TX signal leakage would happen. In addition, non-ideal and nonlinearity effect of components, such as the power amplifier PA, the low noise amplifier LNA and the mixer $MX_R$, would cause TX signal leakage and cause out-of-band (OOB) interference on the received signal d. In other words, the received signal d outputted by the RX chain 12_$r$ may comprise some components of the to-be-sent signal $x_{UL}$, which would be viewed as interference in receiver's perspective, and not simply reflect the to-be-received signal $x_{DL}$, such that a decoding accuracy of a backend baseband decoder of the RX chain 12_$r$ is reduced.

In order to reduce/eliminate the interference component within the received signal d, the transceiving device 10 of the present disclosure comprises an interference cancellation module 16. The interference cancellation module 16 is coupled between the input terminal of the TX chain 12_$t$ and an output terminal of the RX chain 12_$r$. The interference cancellation module 16 may eliminate the component of the to-be-sent signal $x_{UL}$ or interference from the received signal d (at the output terminal of the RX chain 12_$r$) according to the to-be-sent signal $x_{UL}$ (at the input terminal of the TX chain 12_$t$), such that a recover signal e outputted by the interference cancellation module 16 may approach the to-be-received signal $x_{DL}$.

Specifically, the interference cancellation module 16 may comprise an adaptive filter, which may adjust filter coefficients thereof adaptively and use the filter coefficients to generate the recover signal e, so as to approach the to-be-received signal $x_{DL}$.

Figure 3:
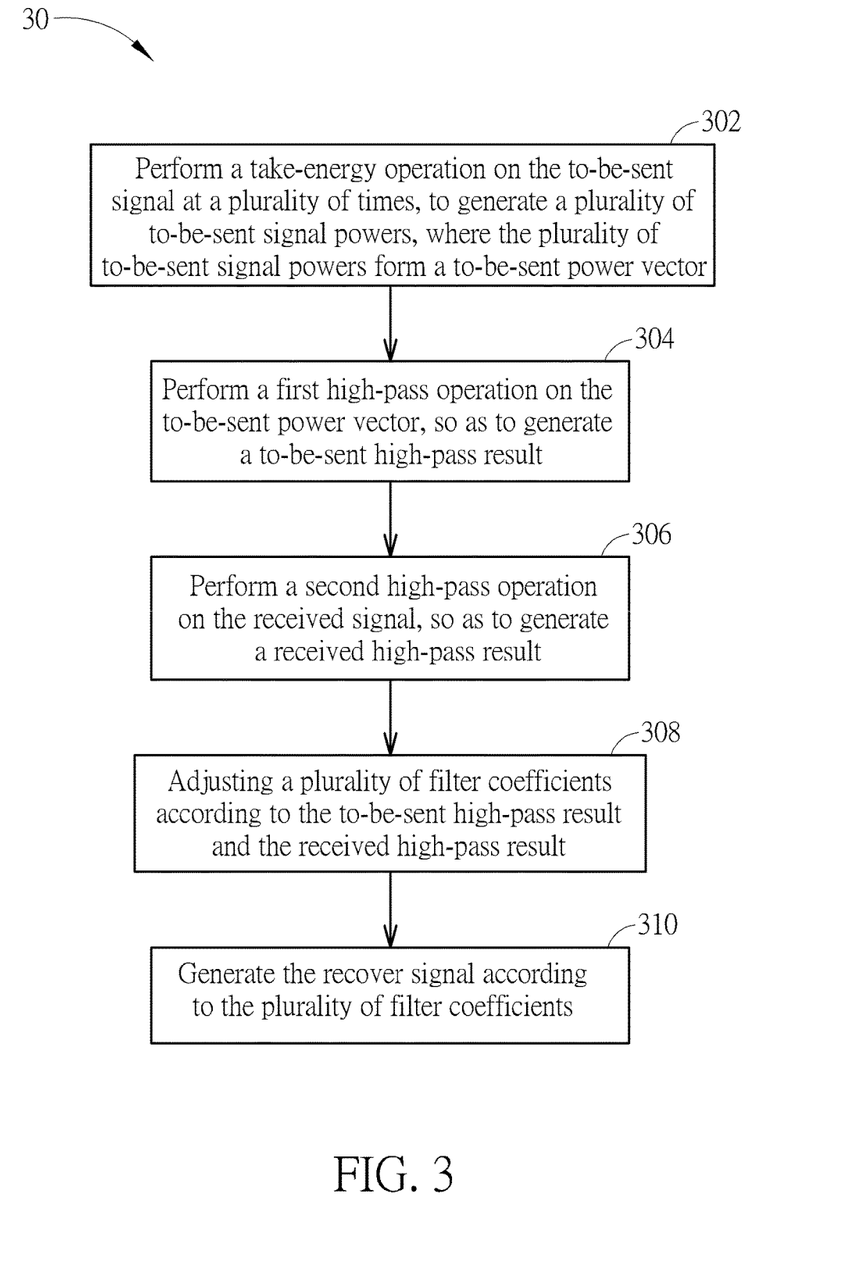
FIG. 3 is a schematic diagram of an interference cancellation process according to an embodiment of the present disclosure.

Reference is also made to FIG. 3 together to describe the operation process of the interference cancellation module 16. FIG. 3 is a schematic diagram of an interference cancellation process 30 according to an embodiment of the present disclosure. In an embodiment, the interference cancellation process 30 may be executed by the interference cancellation module 16, and comprises the following steps:

Step 302: Perform a take-energy operation on the to-be-sent signal at a plurality of times, to generate a plurality of to-be-sent signal powers, where the plurality of to-be-sent signal powers form a to-be-sent power vector.

Step 304: Perform a first high-pass operation on the to-be-sent power vector, so as to generate a to-be-sent high-pass result.

Step 306: Perform a second high-pass operation on the received signal, so as to generate a received high-pass result.

Step 308: Adjusting a plurality of filter coefficients according to the to-be-sent high-pass result and the received high-pass result.

Step 310: Generate the recover signal according to the plurality of filter coefficients.

For illustrative purpose, in the following paragraphs, the to-be-sent signal $x_{UL}$ received by the interference cancellation module 16 at a time index n is denoted as $x_{UL}[n]$, and the received signal d received at the time index n is denoted as d[n], where n is time index.

In Step 302, the interference cancellation module 16 performs the take-energy operation on the to-be-sent signal $x_{UL}[n]$ at different times, so as to obtain the to-be-sent signal powers $|x_{UL}[n]|^2$, $|x_{UL}[n-1]|^2$, $|x_{UL}[n-2]|^2$, etc. For illustrative purpose, every L of the to-be-sent signal powers may form a to-be-sent power vector x. For example, a to-be-sent power vector $x_n$ formed at the time index n may be represented as $x_n = [|x_{UL}[n]|^2, \ldots, |x_{UL}[n-L+1]|^2]^T$. Moreover, the number L represents a length of adaptive filter.

In Step 304, the interference cancellation module 16 performs the first high-pass operation on the to-be-sent power vector x, to generate a to-be-sent high-pass result x'. In some embodiments, the first high-pass operation conceptually related to a first transfer function $H_1$, and a representation of the first transfer function $H_1$ in the z-domain is $H_1(z) = (1-z^{-1})^k$, where k represents a positive integer. In an embodiment of k=1, the first transfer function $H_1$ is expressed as $H_1(z) = 1 - z^{-1}$, and the to-be-sent high-pass result x'(denoted as $x_n'^{(1)}$) corresponding to k=1 and the time index n is expressed as $x_n'^{(1)} = x_n - x_{n-1}$. In an embodiment of k=2, the first transfer function $H_1$ is expressed as $H_1(z) = (1-z^{-1})^2$, and the to-be-sent high-pass result x'(denoted as $x'^{(2)}$) corresponding to k=2 and the time index n is expressed as $x_n'^{(2)} = x_n - 2 \cdot x_{n-1} + x_{n-2}$.

In Step 306, the interference cancellation module 16 performs the second high-pass operation on the received signal d, to generate a received high-pass result d'. In some embodiments, the second high-pass operation is corresponding to a second transfer function $H_2$, and a representation of the second transfer function $H_2$ in the z-domain is $H_2(z) = (1-z^{-1})^k$ (k is a positive integer). In an embodiment of k=1, the second transfer function $H_2$ is expressed as $H_2(z) = 1 - z^{-1}$, the received high-pass result $d_n'$(denoted as $d_n'^{(1)}$) corresponding to k=1 and the time index n is expressed as $d_n'^{(1)} = d[n] - d[n-1]$. In an embodiment of k=2, the second transfer function $H_2$ is expressed as $H_2(z) = (1-z^{-1})^2$, the received high-pass result $d_n'$(denoted as $d_n'^{(2)}$) corresponding to k=2 and the time index n is expressed as $d_n'^{(2)} = d[n] - 2 \cdot d[n-1] + d[n-2]$.

In short, for integer k (especially when k>2), the relationship between the to-be-sent high-pass result $x_n'^{(k)}$(the received high-pass result $d_n'^{(k)}$) and the to-be-sent power vectors $x_n, x_{n-1}, \ldots, x_{n-k}$ (the received signals d[n], d[n-1], \ldots, d[n-k]) follows the pattern Pascal's Triangle, which can be derived by one skilled in the art and is not narrated herein for brevity.

In Step 308, the interference cancellation module 16 adjusts filter coefficients h[0], \ldots, h[L-1] of the (length L) adaptive filter according to the to-be-sent high-pass result x' and the received high-pass result d', where the coefficients h[0], ..., h[L−1] may form a coefficient vector has h=[h[0] ... h[L−1]]$^T$. Moreover, the filter coefficients at the time index n are denoted as $h_n[0], \ldots, h_n[L-1]$, and the coefficient vector h at the time index n is denoted as $h_n$.

In some embodiments, an initial value of the coefficient vector may be set as a predefined vector. For example, $h_0$ may be set as 0, i.e., the coefficients h[0], ..., h[L−1] are all 0.

Figure 4:
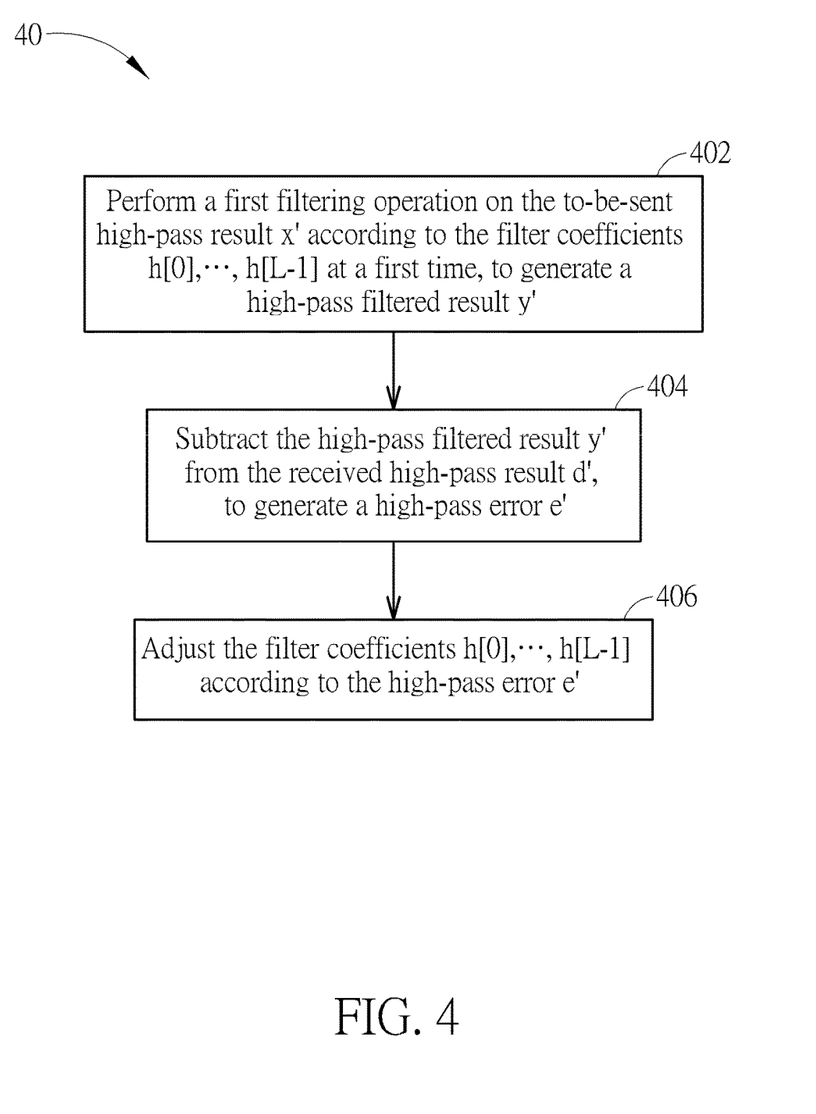
FIG. 4 is a schematic diagram of a coefficient adjusting process according to an embodiment of the present disclosure.

Reference is also made to FIG. 4 to illustrated details of Step 308. FIG. 4 is a schematic diagram of a coefficient adjusting process 40 according to an embodiment of the present disclosure. The coefficient adjusting process 40 comprises the following steps:

Step 402: Perform a first filtering operation on the to-be-sent high-pass result x' according to the filter coefficients h[0], ..., h [L−1] at a first time, to generate a high-pass filtered result y'.

Step 404: Subtract the high-pass filtered result y' from the received high-pass result d', to generate a high-pass error e'.

Step 406: Adjust the filter coefficients h[0], ..., h[L−1] according to the high-pass error e'.

In Step 402, the interference cancellation module 16 may use the coefficient vector $h_n$ at the time index n to perform the first filtering operation on the to-be-sent high-pass result $x_n'$ at the time index n, so as to generate a high-pass filtered result y'[n] corresponding to the time index n as y'[n]=$h_n^H$ $x_n'$. In Step 404, the interference cancellation module 16 may obtain a high-pass error e'[n] corresponding to the time index n as e'[n]=d'[n]−y'[n], where d'[n] is the received high-pass result d' corresponding to the time index n.

In Step 406, the interference cancellation module 16 may use an adaptive algorithm with error feedback mechanism to adjust the filter coefficients h[0], ..., h [L−1] according to the high-pass error e'[n]. Specifically, for any time m, the interference cancellation module 16 may adjust the coefficient vector as $h_{m+1}=h_m+\Delta h_{m+1}$, where $\Delta h_{m+1}$ is an adjustment related to the high-pass error e'[m]. In other words, the interference cancellation module 16 may compute the adjustment $\Delta h_{m+1}$ according to the high-pass error e'[m], so as to generate the adjusted coefficient vector $h_{m+1}$, i.e., to generate the adjusted filter coefficients. In an embodiment, the interference cancellation module 16 may use a Normalized Least Mean Square (NLMS) algorithm, to compute the adjustment $$\Delta h_{n+1} \text{ as } \Delta h_{n+1} = \frac{\mu e'[n] x_n'}{c + \|x_n'\|^2}$$

according to the high-pass error e'[n], where μ is the step size, c is a constant preventing $\Delta h_{n+1}$ from being too large due to the nominator being 0, and the adjustment $\Delta h_{n+1}$ is proportional to a multiplication result of the high-pass error e'[n] and the to-be-sent high-pass result $x_n'$.

In Step 310, the interference cancellation module 16 performs a filtering operation on the to-be-sent power vector x according to the filter coefficients h[0], ..., h[L−1] of the coefficient vector h, so as to obtain a filtered result y expressed as y=$h^H$ x, and to output the recover signal e as a subtraction result of the received signal d and the filtered result y, i.e., e=d−$h^H$ x. Specifically, the interference cancellation module 16 may perform the filtering operation on the to-be-sent power vector $x_n$ corresponding to the time index n according to the coefficient vector $h_n$ corresponding to the time index n, so as to generate the filtered result y[n] corresponding to the time index n, expressed as y[n]=$h_n^H x_n$, and to output the recover signal e[n] corresponding to the time index n as the subtraction result of the received signal d[n] and the filtered result y[n], i.e., e[n]=d[n]−$h_n^H x_n$.

In some embodiments, Step 310 may be executed after Step 302 is executed.

In short, the interference cancellation module 16 treats the to-be-sent high-pass result $x_n'$ of the first high-pass operation as an input signal of a first adaptive filter, treats the received high-pass result d'[n] of the second high-pass operation as a desire signal of the first adaptive filter, treats a difference between the filtered result ($h_n^H x_n'$) of the first adaptive filter and the desire signal (d'[n]) as an error signal of the first adaptive filter (i.e., e'[n]=d'[n]−$h_n^H x_n'$), and adjusts the filter coefficients ($h_{n+1}$) according to the error signal. In addition, the interference cancellation module 16 treats the to-be-sent power vector $x_n$ as an input signal of a second adaptive filter, treats the received signal d[n] as a desire signal of the second adaptive filter, treats a difference between the filtered result ($h_n^H x_n$) of the second adaptive filter and the desire signal (d[n]) (i.e., d[n]−$h_n^H x_n$) as the output of the interference cancellation module 16 (i.e., the recover signal e[n]=d[n]−$h_n^H x_n$).

In another perspective, using the NLMS algorithm to realize the interference cancellation module is to directly treat the to-be-sent power vector $x_n$ as the input signal of the adaptive filter, directly treat the received signal d[n] as the desire signal of the adaptive filter, and treat the error signal (d[n]−$h_n^H x_n$) between the filtered result ($h_n^H x_n$) of the adaptive filter and the received signal d[n] as the output of the interference cancellation module. Since the received signal d comprises some components of the to-be-sent signal $x_{UL}$ or the interference, using the conventional NLMS algorithm may suppress the components of $x_{UL}$, which is not good for the system performance. In comparison, the present disclosure uses a first high pass filtering operation and a second filtering operation to firstly filter out the component related to the to-be-sent signal $x_{UL}$ (for the adjacent times n and n−1, the to-be-sent signal $x_{UL}$ within d[n] and d[n−1] may be regarded as low pass component), and then adjust the filter coefficients according to the high-pass result. Therefore, the recover signal e[n]=d[n]−$h_n^H x_n$ may approach the to-be-received signal $x_{DL}$.

Figure 2:
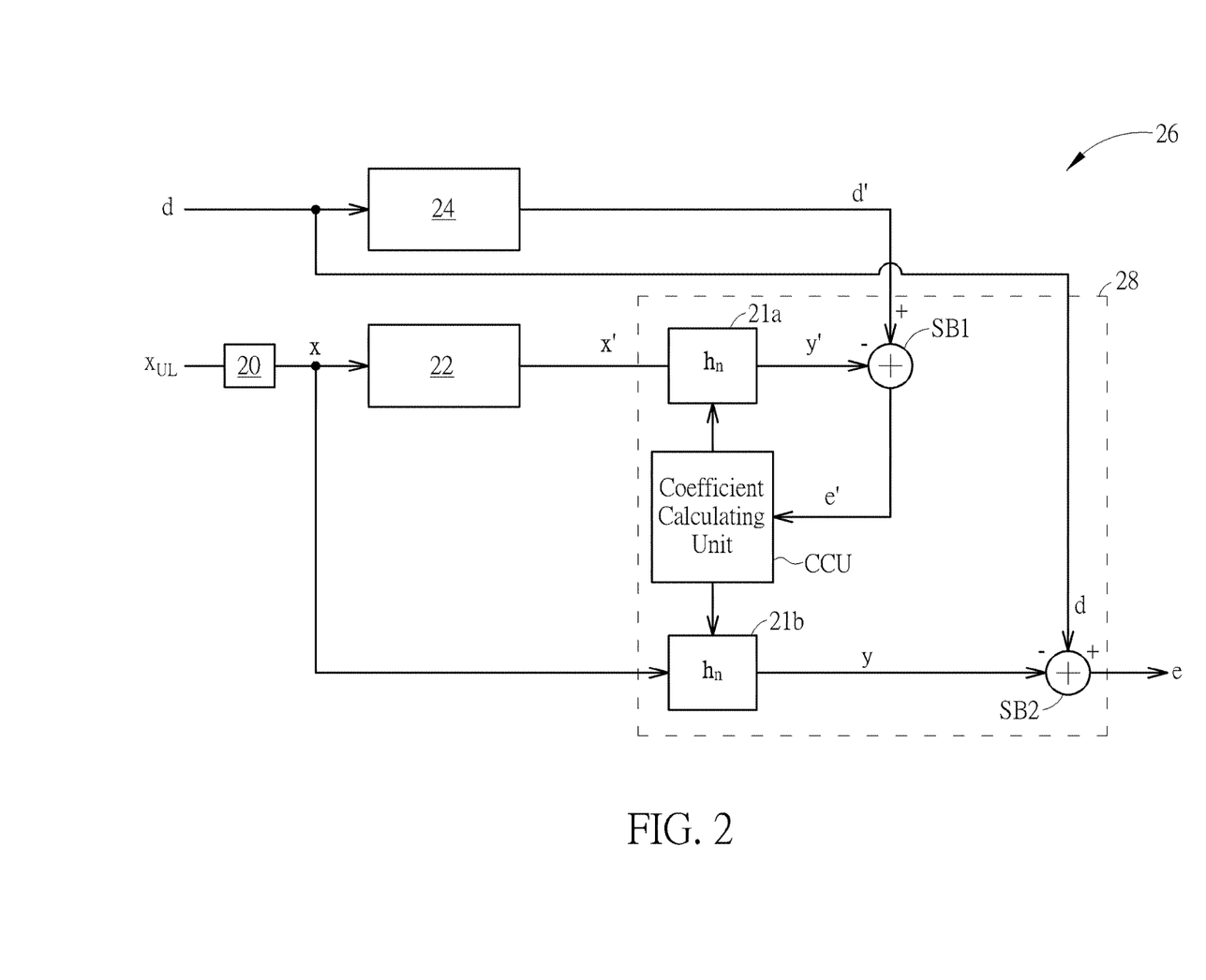
FIG. 2 is a schematic diagram of an interference cancellation module according to an embodiment of the present disclosure.

In another perspective, the interference cancellation module 16 may be realized by a digital signal processor (DSP) or any other processor with computation capability. That is, the interference cancellation process 30 and the coefficient adjusting process 40 may be compiled as a program code and executed by the interference cancellation module 16 or the DSP. In addition, the interference cancellation module 16 may be realized by digital circuit, e.g., RTL circuit. For example, FIG. 2 is a schematic diagram of an interference cancellation module 26 according to an embodiment of the present disclosure. The interference cancellation module 26 may be configured to realize the interference cancellation module 16. The interference cancellation module 26 comprises an energy module 20, a first high pass filter 22, a second high pass filter 24 and an adaptive filtering submodule 28. The energy module 20 is configured to execute Step 302, the first high pass filter 22 is configured to execute Step 304, the second high pass filter 24 is configured to execute Step 306, and the adaptive filtering submodule 28 is configured to execute Steps 308 and 310. Furthermore, the adaptive filtering submodule 28 comprises filters 21a and 21b, subtracters SB1, SB2 and a coefficient calculating unit CCU. The filter 21a is configured to execute Step 402 within Step 308, the subtracter SB1 is configured to execute Step 404 within Step 308, the coefficient calculating unit CCU is configured to execute Step 406 within Step 308, and the filter 21b and the subtracter SB2 are configured to execute Step 310.

Figure 5:
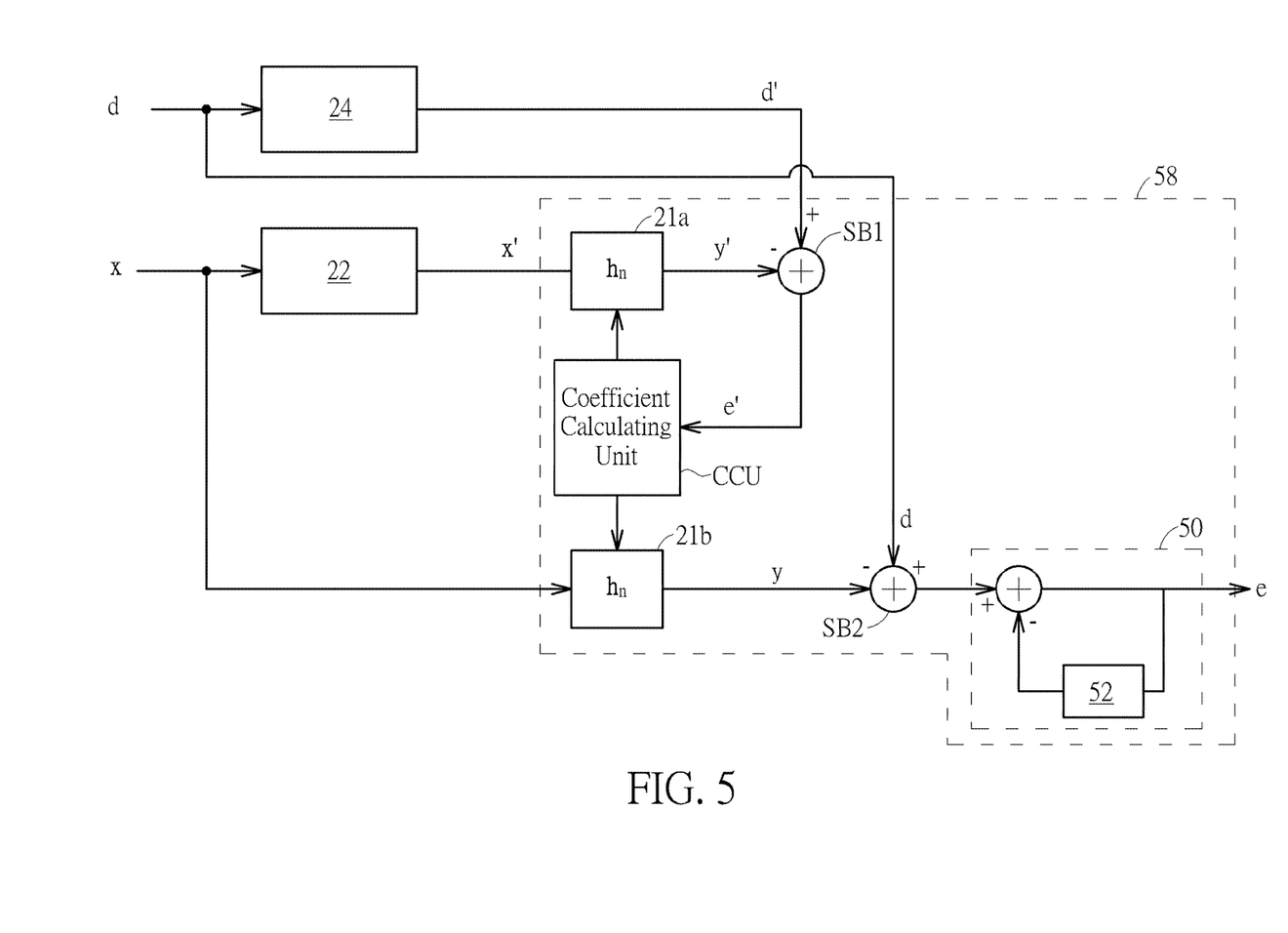
FIG. 5 is a schematic diagram of an adaptive filtering submodule according to an embodiment of the present disclosure.
Figure 6:
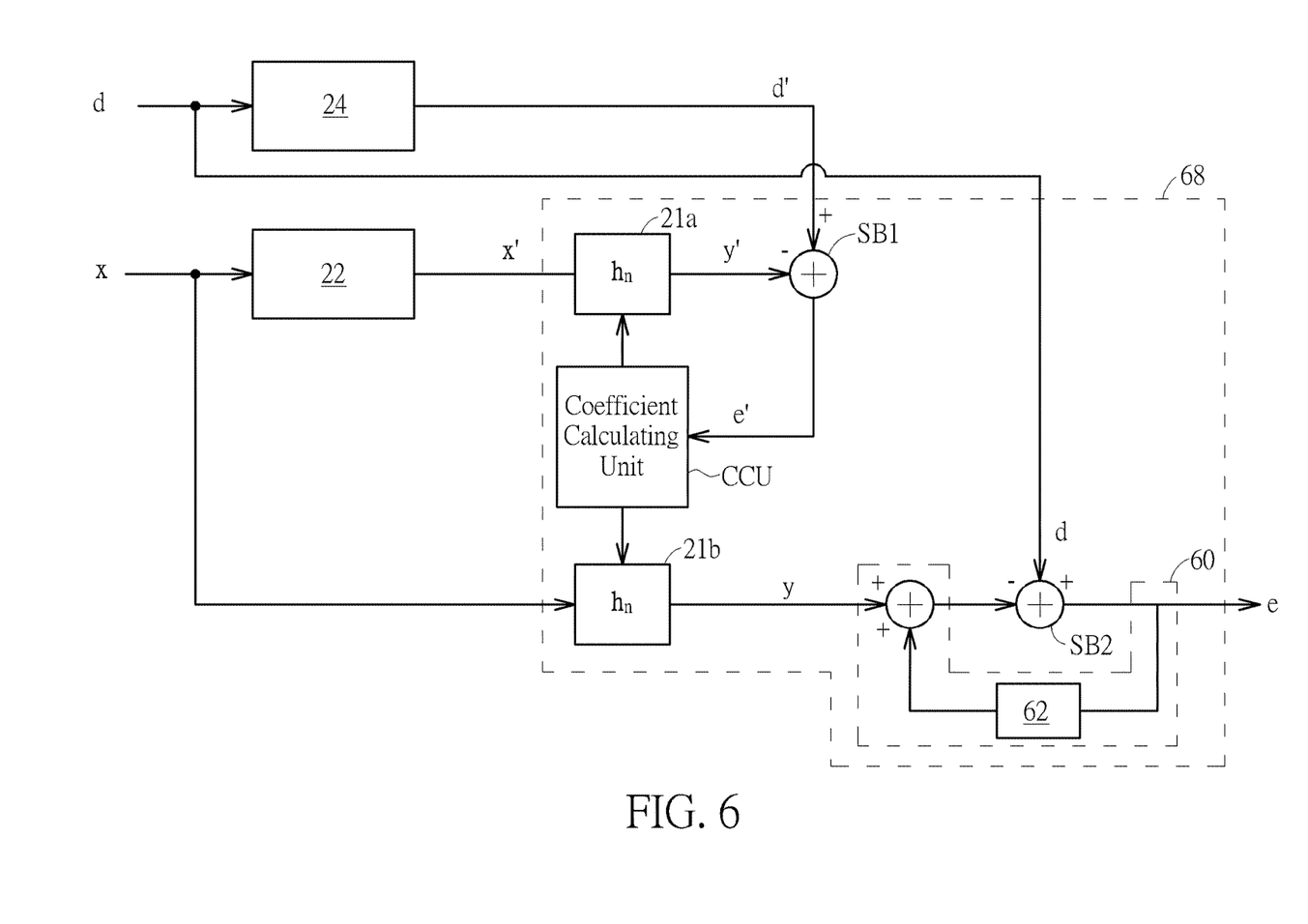
FIG. 6 is a schematic diagram of an adaptive filtering submodule according to an embodiment of the present disclosure.

In addition, to enhance the operation of the circuit, the interference cancellation module may further subtract a direct current (DC) component, wherein the DC component may be adjusted according to the recover signal. Specifically, the interference cancellation module may output the recover signal e[n] as $e[n]=d[n]-h_n^H x_n-h_{DC,n}$, where $h_{DC,n}$ is the DC component corresponding to the time index n. In an embodiment, the interference cancellation module may use the conventional LMS algorithm to adjust the DC component $h_{DC,n}$ according to the recover signal e[n], i.e., $h_{DC,n+1}=h_{DC,n}+\mu_{DC} e[n]$, where $\mu_{DC}$ is a step size corresponding to the DC component. FIG. 5 and FIG. 6 are schematic diagrams of adaptive filtering submodules 58 and 68 according to an embodiment of the present disclosure, respectively. The adaptive filtering submodules 58 and 68 comprise direct current (DC) eliminating units 50 and 60, respectively. The DC eliminating units 50 and 60 are both coupled to the subtracter SB2. The DC eliminating units 50 and 60 are configured to subtract the DC component $h_{DC,n}$ from the subtraction result $d[n]-h_n^H x_n$, so as to output the recover signal e[n] as $e[n]=d[n]-h_n^H x_n-h_{DC,n}$. Moreover, the DC eliminating units 50 and 60 comprise DC adjusting units 52 and 62, respectively. The DC adjusting units 52 and 62 are configured to adjust the DC component $h_{DC,n}$ according to the recover signal e[n], i.e., the DC adjusting units 52 and 62 are configured to compute $h_{DC,n+1}=h_{DC,n}+\mu_{DC} e[n]$.

Notably, Step 406 or the coefficient calculating unit CCU of the present disclosure is not limited to using the NLMS algorithm to adjust the filter coefficients according to the high-pass error. The Recursive Least-Squares (RLS) may also be used, to adjust the filter coefficients. As long as the coefficient calculating unit CCU adjusts the filter coefficients according to the high-pass error (i.e., the difference between $x_n'$ and d' after high pass operation), it is within the scope of the present disclosure.

In summary, the present disclosure uses the high pass filtering operation to firstly filter out the component related to the to-be-sent signal, and then adjust the filter coefficients according to the high-pass result. Therefore, the recover signal may approach the to-be-received signal.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An interference cancellation method, applied in an interference cancellation module of a transceiving device, wherein the interference cancellation module is coupled between a transmitting (TX) chain and a receiving (RX) chain of the transceiving device and configured to generate a recover signal according to a to-be-sent signal at an input terminal of the TX chain and a received signal at an output terminal of the RX chain, the interference cancellation method comprising:
  performing a take-energy operation on the to-be-sent signal at a plurality of times, to generate a plurality of to-be-sent signal powers;
  performing a first high-pass operation on the plurality of to-be-sent signal powers, to generate a to-be-sent high-pass result;
  performing a second high-pass operation on the received signal, to generate a received high-pass result;
  adjusting a plurality of filter coefficients according to the to-be-sent high-pass result and the received high-pass result; and
  generating the recover signal according to the plurality of filter coefficients.

2. The interference cancellation method of claim 1, wherein the first high-pass operation is related to a first transfer function, and a representation of the first transfer function in the z-domain is $H_1(z)=(1-z^{-1})^k$, where $H_1(z)$ represents the first transfer function, and k represents a positive integer.

3. The interference cancellation method of claim 1, wherein the second high-pass operation is corresponding to a second transfer function, and a representation of the second transfer function in the z-domain is $H_2(z)=(1-z^{-1})^k$, where $H_2(z)$ represents the second transfer function, and k represents a positive integer.

4. The interference cancellation method of claim 1, wherein the step of adjusting the plurality of filter coefficients according to the to-be-sent high-pass result and the received high-pass result comprises:
  performing a filtering operation on the to-be-sent high-pass result according to the unadjusted plurality of filter coefficients, to generate a high-pass filtered result;
  subtracting the high-pass filtered result from the received high-pass result, to obtain a high-pass error; and
  adjusting the unadjusted plurality of filter coefficients according to the high-pass error.

5. The interference cancellation method of claim 4, wherein the step of adjusting the unadjusted plurality of filter coefficients according to the high-pass error comprises:
  computing an adjustment, wherein the adjustment is proportional to a multiplication result of the high-pass error and the to-be-sent high-pass result; and
  adding the adjustment to the unadjusted plurality of filter coefficients, to generate the adjusted plurality of filter coefficients.

6. The interference cancellation method of claim 1, wherein the step of generating the recover signal according to the plurality of filter coefficients comprises:
  performing a filtering operation on the plurality of to-be-sent signal powers according to the plurality of filter coefficients, to obtain a filtered result;
  computing a subtraction result of the received signal and the filtered result; and
  outputting the recover signal, wherein the recover signal is related to the subtraction result.

7. The interference cancellation method of claim 6, further comprising:
  outputting the recover signal as the subtraction result minus a direct current (DC) component.

8. The interference cancellation method of claim 7, further comprising:
  adjusting the DC component according to the recover signal.

9. A transceiving device, comprising:
  a transmitting (TX) chain;
  a receiving (RX) chain;
  a duplexer, coupled between an output terminal of the TX chain and an input terminal of the RX chain; and
  an interference cancellation module, coupled between an input terminal of the TX chain and an output terminal of the RX chain and configured to generate a recover signal according to a to-be-sent signal at the input terminal of the TX chain and a received signal at the output terminal of the RX chain, the interference cancellation module comprising:

an energy module, configured to perform a take-energy operation on the to-be-sent signal at a plurality of times to generate a plurality of to-be-sent signal powers;

a first high pass filter, configured to perform a first high-pass operation on the plurality of to-be-sent signal powers, to generate a to-be-sent high-pass result;

a second high pass filter, configured to perform a second high-pass operation on the received signal, to generate a received high-pass result; and an adaptive filtering submodule, configured to adjust a plurality of filter coefficients according to the to-be-sent high-pass result and the received high-pass result, and generate the recover signal according to the plurality of filter coefficients.

10. The transceiving device of claim 9, wherein the first high-pass operation is related to a first transfer function, and a representation of the first transfer function in the z-domain is $H_1(z)=(1-z^{-1})^k$, where $H_1(z)$ represents the first transfer function, and k represents a positive integer.

11. The transceiving device of claim 9, wherein the second high-pass operation is corresponding to a second transfer function, and a representation of the second transfer function in the z-domain is $H_2(z)=(1-z^{-1})^k$, where $H_2(z)$ represents the second transfer function, and k represents a positive integer.

12. The transceiving device of claim 9, wherein the adaptive filtering submodule comprises:

a first filter, configured to perform a first filtering operation on the to-be-sent high-pass result according to the unadjusted plurality of filter coefficients to generate a high-pass filtered result; and a first subtracter, configured to subtract the high-pass filtered result from the received high-pass result to obtain a high-pass error.

13. The transceiving device of claim 12, wherein the adaptive filtering submodule comprises:

a coefficient calculating unit, configured to compute an adjustment according to the high-pass error, and add the adjustment to the unadjusted plurality of filter coefficients, to generate the adjusted plurality of filter coefficients;

wherein the adjustment is proportional to a multiplication result of the high-pass error and the to-be-sent high-pass result.

14. The transceiving device of claim 9, wherein the adaptive filtering submodule comprises:

a second filter, configured to perform a filtering operation on the plurality of to-be-sent signal powers according to the plurality of filter coefficients to obtain a filtered result; and a second subtracter, configured to compute a subtraction result of the received signal and the filtered result;

wherein the adaptive filtering submodule outputs the recover signal related to the subtraction result.

15. The transceiving device of claim 14, wherein the adaptive filtering submodule further comprises:

a direct current (DC) eliminating unit, coupled to the second subtracter, configured to subtract a DC component from the subtraction result, so as to generate the recover signal.

16. The transceiving device of claim 15, wherein the DC eliminating unit comprise:

a DC adjusting unit, configured to adjust the DC component according to the recover signal.

* * * * *